United States Patent
Plondke et al.

(10) Patent No.: US 9,396,012 B2
(45) Date of Patent: Jul. 19, 2016

(54) SYSTEMS AND METHODS OF USING A HYPERVISOR WITH GUEST OPERATING SYSTEMS AND VIRTUAL PROCESSORS

(71) Applicant: QUALCOMM Incorporated, San Diego, CA (US)

(72) Inventors: Erich James Plondke, Austin, TX (US); Lucian Codrescu, Austin, TX (US)

(73) Assignee: Qualcomm Incorporated, San Diego, CA (US)

( * ) Notice: Subject to any disclaimer, the term of this patent is extended or adjusted under 35 U.S.C. 154(b) by 306 days.

(21) Appl. No.: 13/828,183

(22) Filed: Mar. 14, 2013

(65) Prior Publication Data

US 2014/0282507 A1 Sep. 18, 2014

(51) Int. Cl.
*G06F 9/46* (2006.01)
*G06F 9/455* (2006.01)
*G06F 9/48* (2006.01)

(52) U.S. Cl.
CPC ........ *G06F 9/45545* (2013.01); *G06F 9/45533* (2013.01); *G06F 9/45558* (2013.01); *G06F 9/4881* (2013.01)

(58) Field of Classification Search
CPC ............ G06F 9/45533; G06F 9/45545; G06F 9/45558; G06F 9/4881; G06F 9/5038
See application file for complete search history.

(56) References Cited

U.S. PATENT DOCUMENTS

| | | |
|---|---|---|
| 6,286,092 B1 | 9/2001 | Frank et al. |
| 6,516,373 B1 | 2/2003 | Talbot et al. |
| 6,732,250 B2 | 5/2004 | Durrant |
| 6,981,072 B2 | 12/2005 | Day et al. |
| 7,117,481 B1 | 10/2006 | Agesen et al. |
| 7,134,007 B2 | 11/2006 | Zimmer et al. |
| 7,299,337 B2 | 11/2007 | Traut et al. |
| 7,620,678 B1 | 11/2009 | Master et al. |
| 7,685,409 B2 * | 3/2010 | Du et al. ................ 712/228 |
| 7,739,476 B2 | 6/2010 | Pan et al. |
| 7,962,909 B1 | 6/2011 | Klaiber |
| 8,250,254 B2 | 8/2012 | Saripalli |
| 8,312,230 B2 | 11/2012 | Jacobs et al. |
| 8,650,426 B2 | 2/2014 | Rychlik et al. |
| 2002/0138679 A1* | 9/2002 | Koning et al. ............ 710/244 |
| 2004/0139442 A1 | 7/2004 | Miyamoto |
| 2005/0251806 A1* | 11/2005 | Auslander et al. ......... 718/100 |
| 2006/0005188 A1* | 1/2006 | Vega et al. ................. 718/1 |

(Continued)

FOREIGN PATENT DOCUMENTS

EP 2498183 A2 9/2012
WO 0137088 A2 5/2001

(Continued)

OTHER PUBLICATIONS

Tadokoro et al. "A Secure System-wide Process Scheduler across Virtual Machines," 2010 IEEE 16th Pacific Rim International Symposium on Dependable Computing (PRDC), DOI: 10.1109/PRDC.2010.34, Publication Year: 2010, pp. 27-36.

(Continued)

*Primary Examiner* — Abdullah Al Kawsar
(74) *Attorney, Agent, or Firm* — Toler Law Group, PC

(57) ABSTRACT

An apparatus includes a processor and a guest operating system. In response to receiving a request to create a task, the guest operating system requests a hypervisor to create a virtual processor to execute the requested task. The virtual processor is schedulable on the processor.

43 Claims, 6 Drawing Sheets

(56) References Cited

U.S. PATENT DOCUMENTS

| | | | |
|---|---|---|---|
| 2007/0169127 A1* | 7/2007 | Kashyap | 718/104 |
| 2007/0283336 A1 | 12/2007 | Gschwind et al. | |
| 2008/0244599 A1 | 10/2008 | Hodson et al. | |
| 2009/0217276 A1* | 8/2009 | Brenner et al. | 718/102 |
| 2009/0282198 A1 | 11/2009 | Hamoudi et al. | |
| 2010/0107249 A1 | 4/2010 | Krig | |
| 2010/0125708 A1 | 5/2010 | Hall et al. | |
| 2010/0153945 A1 | 6/2010 | Bansal et al. | |
| 2010/0242014 A1 | 9/2010 | Zhu | |
| 2010/0325454 A1 | 12/2010 | Parthasarathy | |
| 2011/0072428 A1 | 3/2011 | Day, II et al. | |
| 2011/0119422 A1* | 5/2011 | Grouzdev | G06F 9/4881 710/262 |
| 2011/0296406 A1 | 12/2011 | Bhandari et al. | |
| 2012/0072638 A1 | 3/2012 | Grubb et al. | |
| 2012/0240112 A1 | 9/2012 | Nishiguchi et al. | |
| 2012/0272015 A1 | 10/2012 | Fahrig | |
| 2012/0291033 A1* | 11/2012 | de Justo Teixeira et al. | 718/102 |
| 2013/0013889 A1 | 1/2013 | Devaraj et al. | |
| 2013/0036323 A1 | 2/2013 | Goose et al. | |
| 2013/0055252 A1 | 2/2013 | Lagar-Cavilla et al. | |
| 2013/0159579 A1* | 6/2013 | Neiger | G06F 9/30076 710/265 |
| 2014/0053272 A1 | 2/2014 | Lukacs et al. | |
| 2014/0149977 A1* | 5/2014 | Barrat | G06F 9/4843 718/1 |
| 2014/0164662 A1* | 6/2014 | van Schaik | G06F 13/26 710/265 |
| 2014/0173597 A1* | 6/2014 | Anand | G06F 9/455 718/1 |
| 2014/0244983 A1 | 8/2014 | McDonald et al. | |
| 2014/0278340 A1* | 9/2014 | Berkowitz | G06F 9/45541 703/23 |
| 2014/0281332 A1 | 9/2014 | Koob et al. | |
| 2014/0282501 A1 | 9/2014 | Zeng et al. | |
| 2014/0282508 A1 | 9/2014 | Plondke et al. | |

FOREIGN PATENT DOCUMENTS

| | | |
|---|---|---|
| WO | 2005029326 A1 | 3/2005 |
| WO | 2008054619 A2 | 5/2008 |
| WO | 2012005949 A2 | 1/2012 |

OTHER PUBLICATIONS

International Search Report and Written Opinion for International Application No. PCT/US2014/023708, ISA/EPO, Date of Mailing Jul. 3, 2014, 8 pages.

Drepper, U., "Futexes are Tricky," Version 1.6, Nov. 5, 2011, Red Hat, Inc., Raleigh, North Carolina, pp. 1-12.

Franke, H., et al., "Fuss, Futexes, and Furwocks: Fast Userlevel Locking in Linux," Proceedings of the Ottawa Linux Symposium, 2002, 19 pages.

* cited by examiner

SYSTEMS AND METHODS OF USING A HYPERVISOR WITH GUEST OPERATING SYSTEMS AND VIRTUAL PROCESSORS

I. FIELD

The present disclosure is generally related to virtualization of operating systems using a hypervisor.

II. BACKGROUND

Advances in technology have resulted in smaller and more powerful computing devices. For example, there currently exist a variety of portable personal computing devices, including wireless computing devices, such as portable wireless telephones, personal digital assistants (PDAs), tablet computers, and paging devices that are small, lightweight, and easily carried by users. Many such computing devices include other devices that are incorporated therein. For example, a wireless telephone can also include a digital still camera, a digital video camera, a digital recorder, and an audio file player. Also, such computing devices can process executable instructions, including software applications, such as a web browser application that can be used to access the Internet and multimedia applications that utilize a still or video camera and provide multimedia playback functionality.

To support such advanced functionality, the computing devices may include an operating system. The operating system may provide abstractions of available hardware resources. For example, an operating system may multiplex system resources (e.g., processor, memory, etc.) amongst various software tasks. The operating system may also schedule tasks for execution and perform memory management. In addition, the operating system may handle blocking and unblocking for events.

In certain situations, it may be advantageous to execute multiple operating systems, or multiple instances of the same operating system, on a single computing device. A hypervisor (also known as a virtual machine monitor) may provide abstractions of available hardware resources to the operating systems. Thus, the hypervisor may act as an operating system for the multiple operating systems (or multiple instances of the same operating system). When a hypervisor is used, the hypervisor may include a scheduler to determine which operating system and task thereof is granted access to a particular hardware resource at a particular time. Thus, multiple levels of scheduling may be executing within the system: a first level may include the schedulers of each individual operating system and a second level may include the scheduler of the hypervisor.

Performing multiple levels of scheduling introduces overhead into the system (e.g., due to context switches performed by the hypervisor). Such overhead may be unacceptable when one or more of the operating systems is a real-time operating system that needs to be able to guarantee certain latencies. To include a real-time operating system in a multiple operating system environment, the real-time operating system is usually given "special" priority. For example, the real-time operating system may have a highest available priority. However, this may be inefficient because task priority information within each operating system may not be accessible to the hypervisor. For example, if the real-time operating system is executing an unimportant task but another operating system is executing an important task, the hypervisor may still schedule the relatively unimportant real-time operating system task first.

III. SUMMARY

Systems and methods of enabling an operating system (e.g., a real-time operating system) to execute with reduced latency in a hypervisor-controlled computing environment are disclosed. Instead of (or in addition to) conventional guest operating systems that have built-in schedulers, the described techniques utilize "thin" guest operating systems that include limited or no scheduling functions and instead rely on the hypervisor for scheduling. Blocking and unblocking may also be handled by the hypervisor instead of by individual operating systems. Further, the hypervisor may have access to information regarding the priorities of the tasks of each of the individual operating systems.

Each time a new task is created at a "thin" operating system, the "thin" operating system may request the hypervisor to create a "virtual processor" for the task. The hypervisor may schedule the virtual processor for execution on underlying physical hardware (e.g., hardware processor(s)), and virtual processors may be maintained as long as the corresponding task exist. For example, each task may be associated with a virtual processor and all scheduling may be handled by the scheduler of the hypervisor. Moreover, the scheduler of the hypervisor may have access to the priorities of individual tasks/virtual processors, which may be used to perform more efficient virtual processor scheduling across all guest operating systems. The described systems and methods may thus simplify individual operating systems and reduce overall latency in the hypervisor-controlled computing environment, thereby enabling the use of one or more real-time operating systems and other operating systems in the hypervisor-controlled computing environment In a particular embodiment, an apparatus includes a processor and a hypervisor. The hypervisor is configured to schedule virtual processors for execution by the processor. Each of the virtual processors has a priority that is accessible to the hypervisor and that corresponds to a task priority of a corresponding task. The task priority is assigned by a guest operating system.

In another particular embodiment, a method includes receiving, at a hypervisor of a computing device, a request from a guest operating system to create a virtual processor to execute a task. The method also includes creating the virtual processor and scheduling the virtual processor for execution on a hardware processor of the computing device. The virtual processor has a priority assigned by the guest operating system, where the priority corresponds to a task priority of the task.

In another particular embodiment, an apparatus includes means for processing and means for scheduling executable by the means for processing. The means for scheduling is configured to schedule virtual processors for execution by the means for processing. Each of the virtual processors has a priority that is accessible to the means for scheduling and that corresponds to a task priority of a corresponding task. The task priority is assigned by a first guest operating system.

In another particular embodiment, a non-transitory computer-readable medium includes instructions that, when executed by a computer, cause the computer to receive, at a hypervisor, a request from a guest operating system to create a virtual processor to execute a task. The instructions, when executed by the computer, also cause the computer to create the virtual processor and to schedule the virtual processor for execution. The virtual processor has a priority corresponding to a task priority of the task. The task priority is assigned by the guest operating system.

In another particular embodiment, an apparatus includes a processor and a guest operating system. In response to receiving a request to create a task, the guest operating system requests a hypervisor to create a virtual processor to execute the task. The virtual processor is schedulable on the processor.

In another particular embodiment, a method includes receiving, at a guest operating system executing at a computing device comprising a hypervisor and at least one processor, a request to create a task. The method also includes, in response to the request to create the task, requesting the hypervisor to create a virtual processor to execute the requested task. The virtual processor is schedulable on the at least one processor.

In another particular embodiment, an apparatus includes a processor and a guest operating system. The guest operating system includes means for requesting a hypervisor to create a virtual processor to execute a task in response to receiving a request to create the task. The virtual processor is schedulable on the processor.

In another particular embodiment, a non-transitory computer-readable medium includes instructions that, when executed by a computer, cause the computer to receive, at a guest operating system, a request to create a task. The instructions, when executed by the computer, also cause the computer to, in response to the request to create the task, request a hypervisor to create a virtual processor to execute the requested task. The virtual processor is schedulable on a hardware processor.

In another particular embodiment, an electronic device includes a processor, a hypervisor, a first guest operating system, and a second guest operating system. At least one task of the first guest operating system is executed by a first virtual processor requested by the first guest operating system from the hypervisor. At least one task of the second guest operating system is executed by a second virtual processor requested by the second guest operating system from the hypervisor. The first virtual processor and the second virtual processor are executed by the processor.

One particular advantage provided by at least one of the disclosed embodiments is an ability to perform prioritized scheduling of tasks from multiple guest operating systems with reduced latency. Another particular advantage provided by at least one of the disclosed embodiments is an ability to use real-time operating system(s) within a hypervisor-controlled computing environment. Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
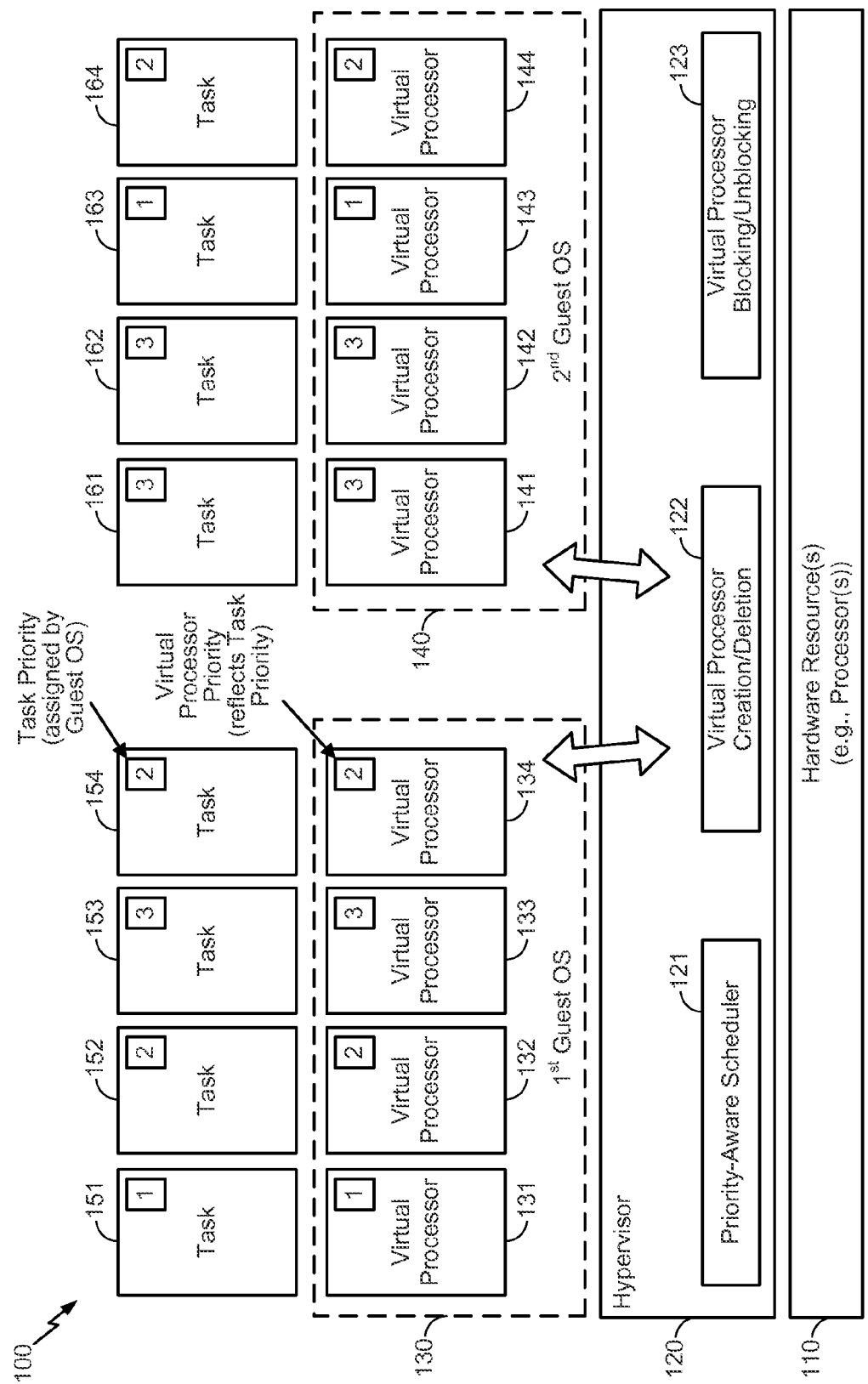
FIG. 1 is a block diagram of an illustrative embodiment of a system that is operable to use a hypervisor with guest operating systems and virtual processors.

FIG. 1 is a block diagram of an illustrative embodiment of a system 100 that is operable to use a hypervisor with guest operating systems and virtual processors. The system 100 includes one or more hardware resources, such as one or more processors 110. The system also includes a hypervisor 120 that is executable by the processors 110. The hypervisor 120 may arbitrate access to the one or more processors 110 by one or more guest operating systems, such as an illustrative first guest operating system 130 and an illustrative second guest operating system 140. As further described herein, one or more of the guest operating systems 130, 140 may be a real-time operating system (RTOS).

The hypervisor 120 may include various logical and/or functional modules. In a particular embodiment, each such module is implemented using software instructions executable by the processors 110. Alternately, selected functionality of the hypervisor 120 may be implemented using hardware devices, such as a controller, an application-specific integrated circuit (ASIC), a field programmable gate array (FPGA) device, or some other device. In the embodiment of FIG. 1, the hypervisor 120 includes a priority-aware scheduler 121, a virtual processor creation/deletion module 122, and a virtual processor blocking/unblocking module 123. It should be noted, however, that the modules 121-123 are for illustration only. In alternate embodiments, functions described with reference to the hypervisor 120 may be carried out using more or fewer modules.

The virtual processor creation/deletion module 122 may be configured to receive a request from either of the guest operating systems 130, 140. For example, the request may be received via an operating system-hypervisor communication mechanism, such as an application programming interface (API) or shared memory region. In response to the request, the virtual processor creation/deletion module 122 may create a virtual processor. To illustrate, the first guest operating system 130 is associated with four tasks 151, 152, 153, and 154. Each of the tasks 151, 152, 153, and 154 is associated with a corresponding virtual processor 131, 132, 133, and 134, respectively. Similarly, the second guest operating system 140 is associated with four tasks 161, 162, 163, and 164. Each of the tasks 161, 162, 163, and 164 is associated with a corresponding virtual processor 141, 142, 143, and 144, respectively. The tasks 151-154 and 161-164 may be associated with user-mode (e.g., application level) or guest-mode (e.g., guest operating system level) routines or subroutines. The tasks 151-154 and 161-164 may correspond to a set of instructions (e.g., program code) that is stored in memory and that is executable by the processors 110. For example, a particular application may be associated with a "main" task and with one or more additional tasks that are generated by the "main task" (e.g., one or more graphical user interface (GUI) tasks, one or more data processing tasks, etc.).

In the system 100 of FIG. 1, virtual processors may be maintained as long as the corresponding tasks are maintained by the corresponding guest operating systems. When a task concludes, the virtual processor creation/deletion module 122 may delete and/or deallocate the virtual processor for the task. The virtual processor creation/deletion module 122 may detect that a task has concluded based on an exit or return command at the processors 110 or in response to a notification from a guest operating system. In a particular embodiment, creating a virtual processor may include allocating hardware and/or software resources to the virtual processor, and deleting a virtual processor may include deallocating hardware and/or software resources of the virtual processor.

It should be noted that from the perspective of the hypervisor 120, each of the virtual processors 131-134 and 141-144 is a schedulable entity. Conversely, from the perspective of the guest operating systems 130 and 140, each of the virtual processors 131-134 and 141-144 may be a hardware resource abstraction. Each of the tasks 151-154 and 161-164 may correspond to one or more threads or software routines/subroutines initiated by the guest operating systems 130 and 140 or applications executing at the guest operating systems 130 and 140.

The priority-aware scheduler 121 may be configured to schedule the virtual processors 131-134 and 141-144 for execution. The scheduler 121 may be considered "priority aware," because the scheduler 121 has access to priority information of individual virtual processors. For example, in the embodiment of FIG. 1, each virtual processor has a virtual processor priority from 1 to 3. A priority of 1 may be a highest priority and a priority of 3 may be a lowest priority. In alternate embodiments, more or fewer priority designations may be used. The priority of a virtual processor may be equal to, reflect, or may otherwise be based on a task priority of a task corresponding to the virtual processor. For example, the virtual processor 134 has a task priority of 2, which is equal to the task priority of the corresponding task 154. The task priority of the task 154 may be assigned by the guest operating system 130 during task creation, as further described herein. Thus, the priority priority-aware scheduler 121 has access to task priority information by virtue of having access to virtual processor priority information. Priority information may be accessible to the priority-aware scheduler 121 directly (e.g., by reading certain data structures in operating system memory, shared memory, or in registers) or indirectly (e.g., via an API).

In a particular embodiment, the priority-aware scheduler 121 may determine whether to schedule a first task or a second task based on a comparison of a first priority of a first virtual processor corresponding to a first task to a second priority of a second virtual processor corresponding to a second task. Further, the priority-aware scheduler 121 may make such comparisons between priorities of virtual processors corresponding to tasks of different operating systems. Thus, instead of automatically prioritizing all tasks of a particular guest operating system (e.g., a real-time operating system (RTOS)) over all tasks of another guest operating system, the priority-aware scheduler 121 may perform task-specific prioritization, which may decrease an overall latency (e.g., measured as an average time between task creation and execution, an average time between beginning and completing task execution, etc.) of the system 100. A RTOS may assign a highest available priority to low-latency (e.g., mission-critical) tasks so that such tasks are prioritized by the priority-aware scheduler 121, but may assign lower priorities to less important RTOS tasks, so that important tasks of other guest operating systems do not have to wait for the less important RTOS tasks to be scheduled.

In the embodiment of FIG. 1, both guest operating systems support task priorities from "1" to "3." However, these priorities are for illustration only. In alternate embodiments, guest operating systems may support non-overlapping or partially overlapping sets of priorities. For example, the first guest operating system 130 may be a real-time operating system that supports tasks priorities "1" to "3" and the second guest operating system 140 may be a non-real-time operating system that supports task priorities "2" to "4." Thus, real-time operating system(s) (and tasks thereof) may have access to at least one elevated task priority level (e.g., task priority "1") that is unavailable to non real-time operating system(s) (and tasks thereof).

The hypervisor 120 may also include the virtual processor blocking/unblocking module 123. The virtual processor blocking/unblocking module 123 may be configured to block and unblock the virtual processors 131-134 and 141-144. It will be appreciated that because there is a one-to-one mapping between tasks and virtual processors in the system 100, the "thin" guest operating systems 130 and 140 may rely on the hypervisor 120 for blocking and unblocking of virtual processors instead of implementing task blocking and unblocking logic within the guest operating systems 130 and 140. This approach simplifies the design and implementations of the guest operating systems 130 and 140. Examples of blocking/unblocking situations may include, but are not limited to, when a task sleeps until a synchronization object (e.g., a mutex or semaphore) becomes available, until data is available or certain processing operations are completed (e.g., by another task), or until some other unblocking condition is satisfied.

Figure 2:
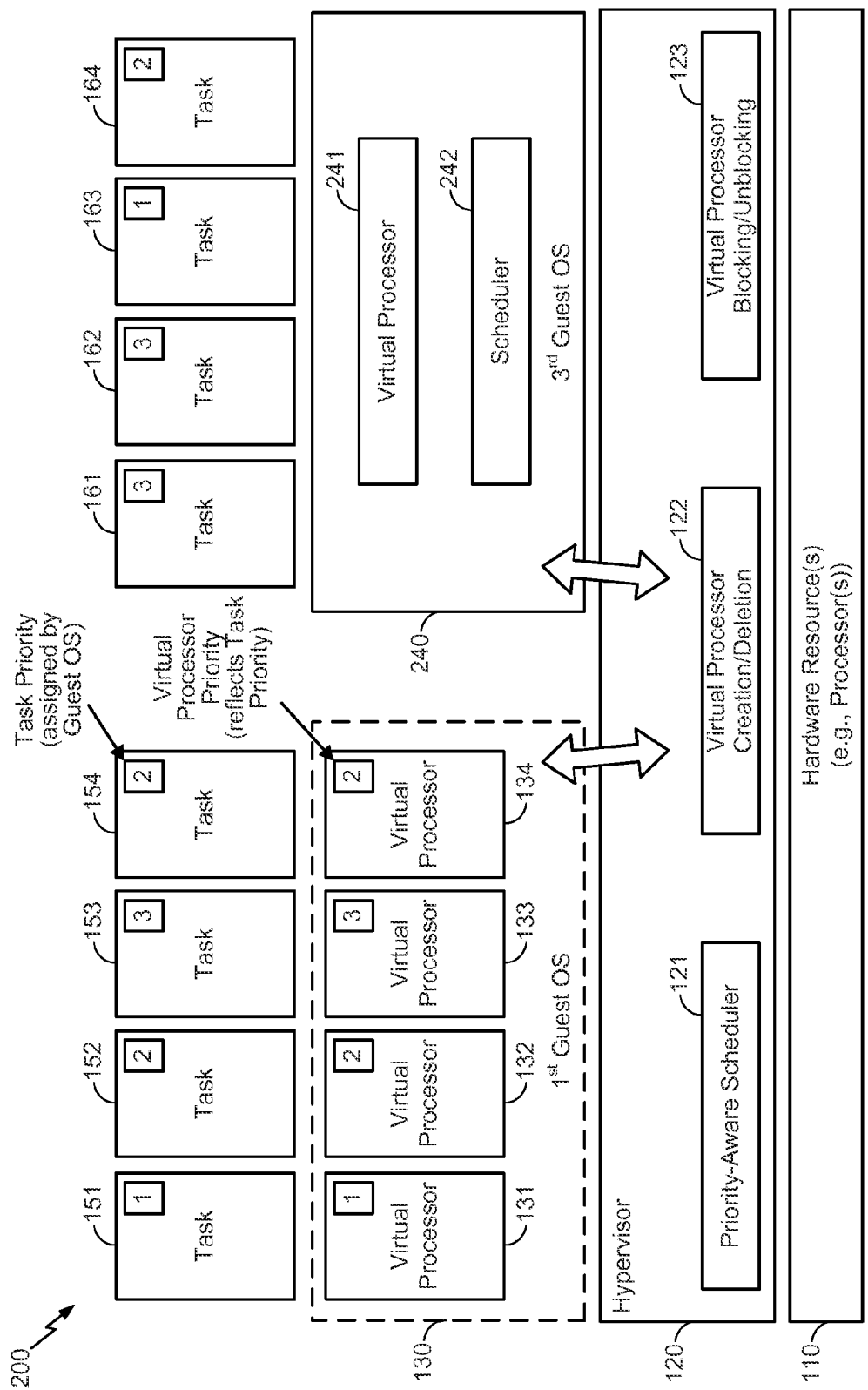
FIG. 2 is a block diagram of another illustrative embodiment of a system that is operable to use a hypervisor with guest operating systems and virtual processors.

The guest operating systems 130 and 140 may each be a "thin" operating system that includes little or no scheduling logic. Instead, the guest operating systems 130 and 140 rely on the hypervisor 120 for scheduling functions. The guest operating systems 130 and 140 may also rely on the hypervisor 120 for blocking and unblocking of tasks. It should be noted that although two guest operating systems are shown in FIG. 1, this is for example only. In alternate embodiments, more or fewer guest operating systems may be supported by the hypervisor 120. Moreover, the hypervisor 120 may simultaneously support one or more "thin" operating systems and one or more conventional operating systems that include scheduling and blocking/unblocking logic For example, the hypervisor 120 may perform priority-aware scheduling and blocking/unblocking for the "thin" operating systems but not for the full operating systems (e.g., operating systems that include their own scheduler). For example, FIG. 2 illustrates a hypervisor-controlled computing environment 200 in which the "thin" operating system 130 coexists with a conventional operating system 240 that includes a single virtual processor 241 and a "native" operating system scheduler 242. Other components of FIG. 2 may function as described with reference to corresponding components of FIG. 1.

During operation, the guest operating systems 130 and 140, and/or applications executing at the guest operating systems 130 and 140, may create tasks (e.g., in response to task creation requests issued by applications). In response to a task creation request, the guest operating systems 130 and 140 may request the hypervisor 120 to create a virtual processor to execute the requested task. For example, the virtual processor creation/deletion module 122 may create the virtual processor 134 in response to a request from the first guest operating system 130 associated with the task 154. The virtual processor creation/deletion module 122 may assign the created virtual processor 134 a priority of "2," reflecting the task priority of the task 154. The priority-aware scheduler 121 may schedule the virtual processor 134. For example, scheduling a virtual processor for execution may include placing the virtual processor in an execution queue of the hardware processors 110, allocating execution cycles or time slices of the processors 110 to the virtual processor, etc. The virtual processor blocking/unblocking module 123 may block and unblock the virtual processor 134 in response to requests from the first guest operating system 130 to block and unblock the task 154. Upon completion of the task 154, the virtual processor creation/deletion module 122 may delete the virtual processor 134.

In a particular embodiment, one or more of the guest operating systems 130 and 140 may be a RTOS. For example, the system 100 may be integrated into a wireless phone and one of the guest operating system 130 or 140 may be an operating system of a modem in the wireless phone that provides certain latency guarantees. To illustrate, the modem operating system may guarantee that scheduling latencies are under 20 microseconds (µs) to meet real-time deadlines. Conventional hypervisors, which may have latencies on the order of milliseconds, may not provide sufficient responsiveness if one of the operating systems is a real-time operating system. However, the techniques described herein may enable the hypervisor 120 of FIG. 1 to support reduced latencies that are acceptable to the modem operating system or other RTOS. The system 100 of FIG. 1 may thus be used in wireless phones and other wireless communication devices (e.g., laptop or tablet computing devices).

In a particular embodiment, the system 100 may be incorporated into an electronic device that includes one or more multithreaded and/or multi-core processors. For example, the system 100 may be used to implement real-time multi-threaded computing. A multithreaded processor can be implemented via a processor with multiple hardware execution contexts executing concurrently, or as multiple processors with a single hardware execution context (e.g., a symmetric multiprocessing (SMP) cluster).

The described techniques may be applicable in various electronic devices. To illustrate, mobile electronic devices (e.g., wireless phones) typically include modem software, modem firmware, and audio processing, each of which may utilize different operating systems or operating system images (e.g., due to different latency requirements). The system 100 of FIG. 1 may enable modem firmware and modem software to share the same DSP (e.g., multiple copies of the same operating system may be guest operating systems) while meeting latency requirements. In a particular embodiment, a wireless phone may include a guest RTOS for modem operations and another operating system for applications (e.g., a web server to support a laptop computer that uses the wireless phone for Wi-Fi connectivity), where both operating systems run on the same DSP instead of different processors (e.g., a device that includes a DSP and a separate application processor). It will be appreciated that enabling multiple (or all) operating systems of a device to run on the same processor or set of processors may decrease a production/manufacturing cost associated with the device.

The system 100 of FIG. 1 may thus provide a hypervisor-controlled computing environment without excessive context switching (e.g., switching between different schedulable entities), because one virtual processor is assigned per task. Each task of an operating system may be performed by a distinct virtual processor that is scheduled by the hypervisor 120 and executed by the processor(s) 110. Moreover, the decreased overhead from implementing a single scheduling layer may provide decreased latency, enabling the use of multiple real time operating systems in the system 100. The system 100 of FIG. 1 may represent a paradigm change in operating system design. Conventionally, an operating system is designed to run "on the metal" (i.e. in view of hardware implementations details), and a hypervisor is designed to support the operating system. In contrast, the system 100 of FIG. 1 reflects an operating system/hypervisor "co-design" paradigm, in which an operating system and a hypervisor are specifically implemented to rely on each other for certain functions, which may reduce redundancy (e.g., one scheduler instead of multiple schedulers) and decrease latency.

Figure 3:
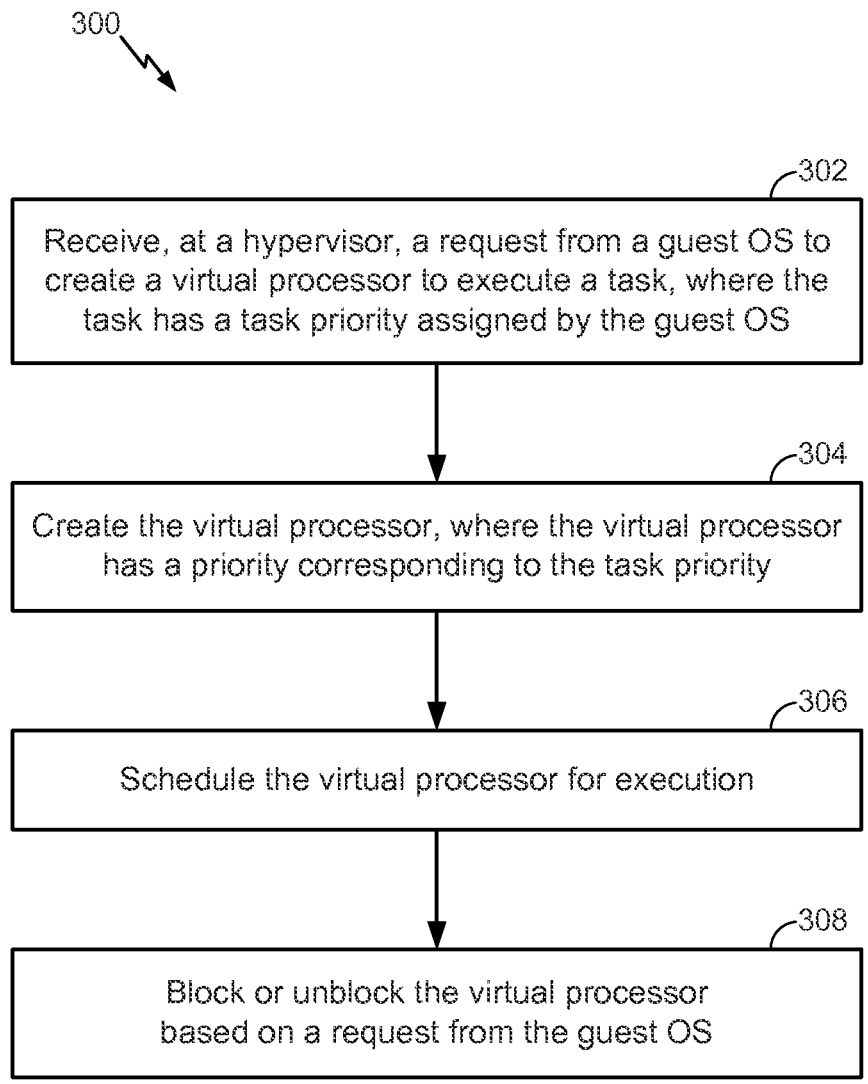
FIG. 3 is a flowchart of an illustrative embodiment of a method of operation at the hypervisor of FIG. 1.

FIG. 3 is a flowchart to illustrate a particular method 300 of operation at a hypervisor. In an illustrative embodiment, the method 300 may be performed by the hypervisor 120 of FIGS. 1-2.

The method 300 may include receiving, at a hypervisor, a request from a guest operating system to create a virtual processor to execute a task, where the task has a task priority assigned by the guest operating system, at 302. For example, in FIG. 1, the hypervisor 120 may receive a request from the second guest operating system 140 to create a virtual processor to execute the task 163, where the task 163 has a task priority of "1" assigned by the second guest operating system 140.

The method 300 may also include creating the virtual processor, where the virtual processor has a priority corresponding to the task priority, at 304. For example, in FIG. 1, the hypervisor 120 may create the virtual processor 143 to execute the task, where the virtual processor 143 has a priority of "1," which corresponds to the task priority of the task 163.

The method 300 may further include scheduling the virtual processor for execution, at 306, and blocking or unblocking the virtual processor based on a request from the guest operating system, at 308. For example, in FIG. 1, the hypervisor 120 may schedule the virtual processor 143 for execution and block/unblock the virtual processor 143 based on requests from the second guest operating system 140. The hypervisor may also delete or deallocate the virtual processor 143 upon completion of the task 163.

The method 300 of FIG. 3 may thus enable a hypervisor to create and perform scheduling (e.g., priority-aware scheduling) of virtual processors corresponding to operating system tasks. For example, by performing priority-aware scheduling, the hypervisor may enable a real-time operating system to meet latency requirements without letting the real-time operating system dominate hardware resources and negatively impact the performance of non-real-time operating systems. The method 300 of FIG. 3 may also enable the hypervisor to perform blocking and unblocking. "Thin" operating systems that do not include scheduling and blocking/unblocking logic may rely on the hypervisor for scheduling and blocking/unblocking functionality, which may reduce redundancy and latency in a computing system.

The method 300 of FIG. 3 may be implemented by a digital signal processor (DSP), a processing unit such as a central processing unit (CPU), a controller, a field-programmable gate array (FPGA) device, an application-specific integrated circuit (ASIC), another hardware device, a firmware device, or any combination thereof. As an example, the method 300 of FIG. 3 can be performed by a processor that executes instructions, as described with respect to FIG. 5.

Figure 4:
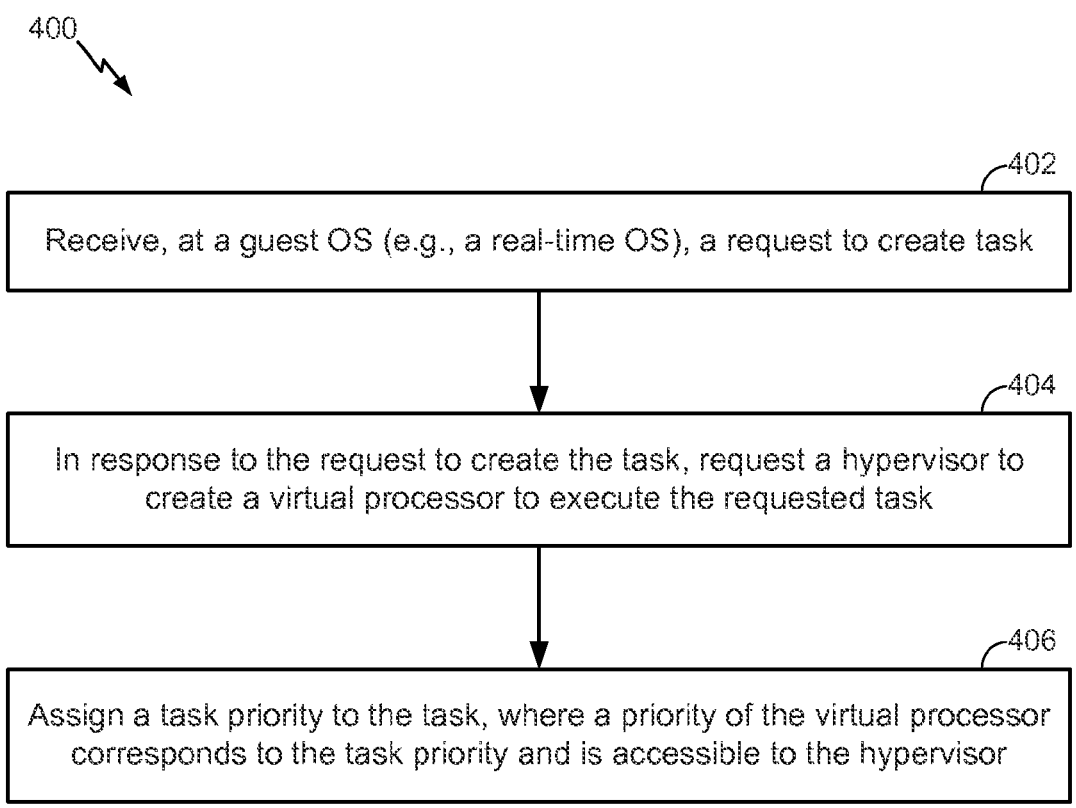
FIG. 4 is a flowchart of an illustrative embodiment of a method of operation at one of the guest operating systems of FIG. 1.

FIG. 4 is a flowchart to illustrate a particular method 400 of operation at an operating system (e.g., a guest operating system in a hypervisor-controlled computing environment). In an illustrative embodiment, the method 400 may be performed by the first guest operating system 130 of FIGS. 1-2 or the second guest operating system 140 of FIG. 1.

The method 400 may include receiving, at a guest operating system, a request to create a task, at 402. In a particular embodiment, the guest operating system may be a real-time operating system. For example, in FIG. 1, the first guest operating system 130 may be a real-time operating system that receives a request to create a task (e.g., the task 151) from an application executing on the first guest operating system 130.

The method 400 may also include, in response to the request to create the task, requesting a hypervisor to create a virtual processor to execute the requested task, at 404. For example, in FIG. 1, the first guest operating system 130 may request the hypervisor 120 to create a virtual processor (e.g., the virtual processor 131) to execute the requested task.

The method 400 may further include assigning a task priority to the task, where a priority of the virtual processor corresponds to the task priority and is accessible to the hypervisor, at 406. For example, in FIG. 1, the first guest operating system may assign a task priority of "1" to the task 151, and the virtual processor 131 may have the priority "1" corresponding to the task priority of the task 151.

The method 400 of FIG. 4 may thus enable an operating system to use priority-aware hypervisor scheduling of virtual processors corresponding to operating system tasks. "Thin" operating systems that do not include scheduling and blocking/unblocking logic may rely on the hypervisor for scheduling and blocking/unblocking functionality, which may reduce redundancy and latency in a computing system.

The method 400 of FIG. 4 may be implemented by a digital signal processor (DSP), a processing unit such as a central processing unit (CPU), a controller, a field-programmable gate array (FPGA) device, an application-specific integrated circuit (ASIC), another hardware device, a firmware device, or any combination thereof. As an example, the method 400 of FIG. 4 can be performed by a processor that executes instructions, as described with respect to FIG. 5.

Figure 5:
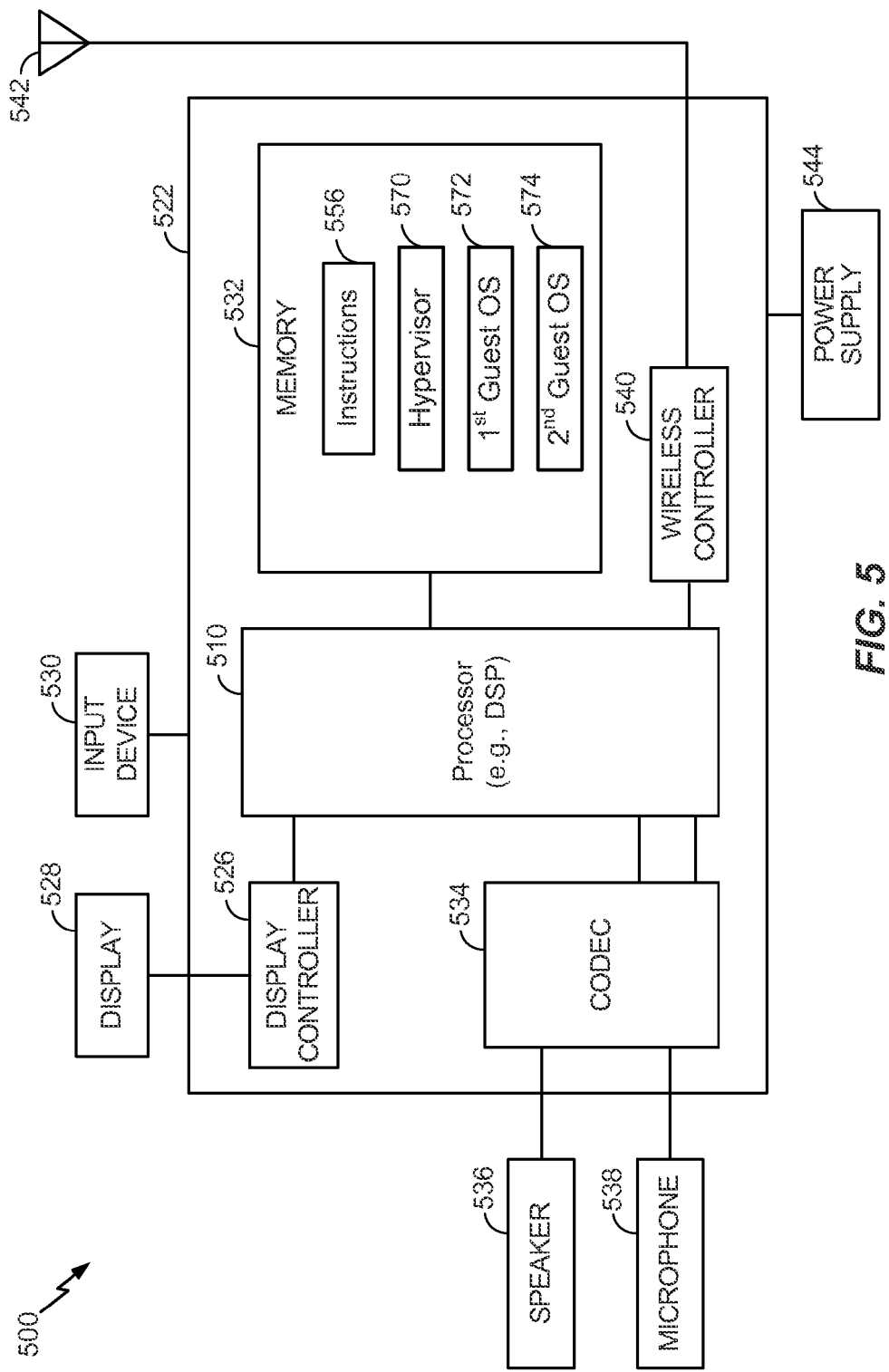
FIG. 5 is a block diagram of a wireless device including components operable to support use of a hypervisor with guest operating systems and virtual processors.

Referring to FIG. 5, a block diagram of an electronic device 500 is shown. The electronic device 500 includes a processor 510, such as a digital signal processor (DSP), coupled to a memory 532. In a particular embodiment, the electronic device 500, or components thereof, may be included in a set top box, a music player, a video player, an entertainment unit, a navigation device, a communications device, a personal digital assistant (PDA), a fixed location data unit, a computing device, or any combination thereof.

FIG. 5 also shows a display controller 526 that is coupled to the processor 510 and to a display 528. A coder/decoder (CODEC) 534 can also be coupled to the processor 510. A speaker 536 and a microphone 538 can be coupled to the CODEC 534. FIG. 5 also indicates that a wireless controller 540 can be coupled to the processor 510 and to an antenna 542 (e.g., via a radio frequency (RF) interface).

The memory 532 may be a tangible non-transitory computer-readable or processor-readable storage medium that includes executable instructions 556. The instructions 556 may be executed by a processor, such as the processor 510 to perform various functions and methods, including the methods 300, 400 of FIGS. 3-4. The memory may also store instructions corresponding to a hypervisor 570 (e.g., the hypervisor 120 of FIGS. 1-2), a first guest operating system 572 (e.g., the first guest operating system 130 of FIGS. 1-2), a second guest operating system 574 (e.g., the second guest operating system 140 of FIG. 1). Additional operating systems (e.g., the third guest operating system 240 of FIG. 2) may also be included.

In a particular embodiment, the processor 510, the display controller 526, the memory 532, the CODEC 534, and the wireless controller 540 are included in a system-in-package or system-on-chip device 522. In a particular embodiment, an input device 530 and a power supply 544 are coupled to the system-on-chip device 522. Moreover, in a particular embodiment, as illustrated in FIG. 5, the display 528, the input device 530, the speaker 536, the microphone 538, the antenna 542, and the power supply 544 are external to the system-on-chip device 522. However, each of the display 528, the input device 530, the speaker 536, the microphone 538, the antenna 542, and the power supply 544 can be coupled to a component of the system-on-chip device 522, such as an interface or a controller.

The described techniques enable the use of multiple guest operating systems, including one or more "thin" real-time operating systems that rely on a hypervisor for scheduling and blocking/unblocking functionality. In a particular embodiment, guest operating systems (and tasks thereof) may communicate with each other and may share synchronization primitives. For example, one guest operating system may be associated with a modem of a wireless communication device (e.g., a cellular telephone) and another guest operating system may be associated with audio processing (e.g., speech encoding/decoding).

In embodiments in which guest operating systems are able to communicate, security measures may be put in place. The security measures may be designed such that quality of service (QoS) guarantees (e.g., latency requirements for real-time operating systems) are maintained.

A communication mechanism (e.g., synchronization primitive) may be used for blocking/unblocking tasks/virtual processors (e.g., by the virtual processor blocking/unblocking module 123 of FIG. 1). In a particular embodiment, a single-bit or a multi-bit data value in memory may be used for the synchronization primitive. One or more rules may govern the use of the synchronization primitive. For example, a first rule may indicate that if the synchronization primitive is unlocked (e.g., set to zero), the synchronization primitive can be locked (e.g., set to one) by a thread (e.g., a task of a guest operating system or a corresponding virtual processor). After the synchronization primitive is locked by a thread (also referred to as the thread "holding" the synchronization primitive), data protected by the synchronization primitive can be written by the thread. A second rule may indicate that if the synchronization primitive is locked, a thread seeking to acquire the synchronization primitive should block until the synchronization primitive is unlocked. In alternate embodiments, the synchronization primitive may be a multi-bit value representing more than two states. For example, an unlocked state may be represented by a first value, a locked-with-no-waiting-threads state may be represented by a second value, and a locked-with-at-least-one-waiting-thread may be represented by a third value. In a particular embodiment, the synchronization primitive may be stored at a user-mode address of memory that is shared between multiple guest operating systems (e.g., the synchronization primitive may be stored in userspace).

It will be appreciated that in a hypervisor-controlled environment with multiple guest operating systems, tasks in one guest operating system may depend on tasks in another guest operating system. For example, when a first task of a first guest operating system blocks because a second task of a second guest operating system holds a synchronization primitive, the first task of the first guest operating system may not be able to proceed until the second task of the second guest operating system releases the synchronization primitive. The blocked first task may have read-only access to the synchronization primitive but the second task may have read-write access to the synchronization primitive.

In a particular embodiment, a blocking function call available to tasks executing in guest operating systems may include two arguments: a pointer to the synchronization primitive and an expected value of the synchronization primitive. A hypervisor may check if the value of the synchronization primitive at the address indicated by the pointer is equal to an expected value. If the values are equal, blocking is successful. If the values are not equal, the hypervisor returns without blocking. A wakeup function may include two arguments: a pointer to the synchronization primitive and a maximum number of threads that can be woken up depending on the value of the synchronization primitive.

In a particular embodiment, a timeout may be implemented for blocking. For example, a task that blocks on a synchronization primitive may automatically wake up if the synchronization primitive is not released within a particular amount of time (e.g., in response to expiration of a timeout period).

In a particular embodiment, a global set of priorities may be used for operating systems in a hypervisor-controlled computing environment. In some cases, real-time operating system(s) may have access to one or more elevated priorities, of the global set of priorities, that non real-time operating systems do not have access to. When different tasks from different guest operating systems can have different priorities of a global set of priorities, priority inversion may occur. For example, priority inversion may occur when threads of differing priority compete for a synchronization primitive. Priority inversion may result in operating inefficiencies and potential deadlock. For example, a high priority thread (e.g., of a real-time operating system) may wait on a synchronization primitive that is being used by a low priority thread (e.g., of a non real-time operating system). The low priority thread (and by extension, the waiting high priority thread) may be preempted by the medium priority threads. Due to the preemption, the low priority thread may not be able to complete execution to release the synchronization primitive so that the high priority thread may acquire the synchronization primitive and continue execution. Since medium priority threads are effectively preempting a high priority thread, the priorities of the medium priority threads and the high priority thread may be said to be "inverted."

Priority inheritance is a technique that may be used to avoid priority inversion. In priority inheritance, when a high priority thread (e.g., priority=1) blocks on a low priority thread (e.g., priority=3), the low priority thread "inherits" the priority of the blocking high priority thread (e.g., the low priority thread inherits a priority=1). This inheritance keeps medium priority threads (e.g., priority=2) from causing priority inversion. In computing environments that include multiple guest operating systems, priority inversion may occur with respect to tasks of a single guest operating system or with respect to tasks of multiple guest operating systems.

Figure 6:
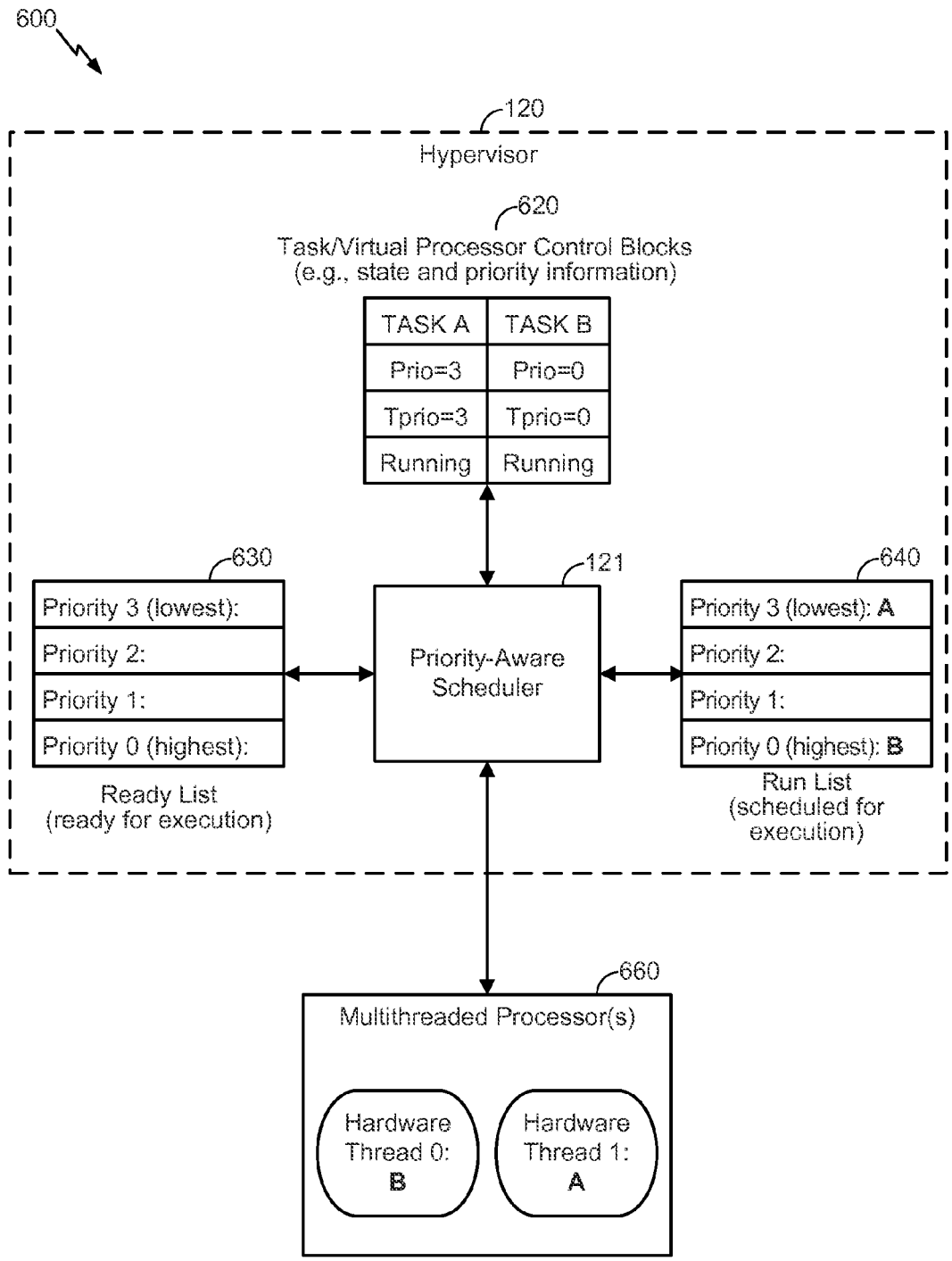
FIG. 6 is a block diagram of an illustrative embodiment of a system operable to perform priority inheritance.

FIG. 6 illustrates an embodiment of a system 600 that is operable to perform priority inversion. The system 600 includes the hypervisor 120 and one or more multithreaded processors 660 (e.g., the processor(s) 110 of FIG. 1). A multithreaded processor can be implemented via a processor with multiple hardware execution contexts executing concurrently, or as multiple processors with a single hardware execution context (e.g., a symmetric multiprocessing (SMP) cluster). In a particular embodiment, the hypervisor 120 may implement a priority inversion avoidance scheme. According to the scheme, each guest operating system has a maximum allowed priority that is established when the guest operating system is loaded by the hypervisor 120. Each guest operating system can elevate its own tasks/threads (and by extension, virtual processors) to its maximum allowed priority. However, a guest operating system is prohibited from elevating its maximum allowed priority. Instead, only a higher-priority guest operating system can elevate a lower-priority task of another lower-priority guest operating system via the priority inheritance system. This enables the high priority task and guest operating system environment do determine whether task priorities should be adjusted when synchronization primitives are used.

In a particular embodiment, the hypervisor 120 may implement "lazy" priority inheritance. The hypervisor 120 may maintain control blocks 620 indicating a priority ("Prio"), a temporary priority ("Tprio"), and a status (e.g., "Running," "Blocked," "Ready," etc.) of tasks/virtual processors. When the priority-aware scheduler 121 determines that a first task is blocked from execution by a second lower priority task, the second task may inherit a temporary priority equal to the priority of the first task. The temporary priority may be set without modifying the contents of scheduling data structures.

For example, scheduling data structures may include a ready list 630 and a run list 640, as shown. The ready list 630 may indicate tasks (or corresponding virtual processors) that are ready for execution (e.g., not blocked on any synchronization primitives). The run list 640 may indicate tasks (or corresponding virtual processors) that are scheduled for execution and/or are being executed. In the embodiment illustrated, the ready list 630 and the run list 640 include one "slot" for each of four priorities available in the system 600. However, this is for illustration purposes only. In alternate embodiments, the ready list 630 and the run list 640 may be organized differently.

During normal operation when priority inversion does not occur, the "lazy" priority inversion may be low-cost, because only a temporary priority (designated "Tprio" in FIG. 6) is set by the hypervisor 120 and no scheduling data is affected. However, if the second task is preempted by another task, the second task (or corresponding virtual processor) may be rescheduled for execution using the temporary priority. The second task may execute at the higher temporary priority, enabling the system to make progress towards executing the first task.

In conjunction with the described embodiments, an apparatus is disclosed that includes means for processing. For example, the means for processing may include a hardware processor, such as the one or more processors 110 of FIGS. 1-2 or the processor 510 of FIG. 5, one or more other devices or circuits to process data, or any combination thereof. The apparatus also includes means for scheduling that is executable by the means for processing. The means for scheduling is configured to schedule virtual processors for execution by the means for processing, each of the virtual processors having a priority accessible to the means for scheduling and corresponding to a task priority of a corresponding task, the task priority assigned by a first guest operating system. For example, the means for scheduling may be the priority-aware scheduler 121 of FIGS. 1-2, the hypervisor 570 of FIG. 5, one or more other devices, circuits, modules, or instructions to schedule a virtual processor for execution, or any combination thereof.

In a particular embodiment, an apparatus includes a processor and a guest operating system. The guest operating system includes means for requesting a hypervisor to create a virtual processor to execute a task in response to receiving a request to create the task. The virtual processor may be scheduled on the processor. For example, the means for requesting may be a component (e.g., an operating system-hypervisor communication mechanism, such as an API or shared memory region) of the guest operating system 130 of FIGS. 1-2, a component of the guest operating system 140 of FIG. 1, one or more other devices, circuits, modules, or instructions to request a hypervisor to create a virtual processor, or any combination thereof.

Those of skill would further appreciate that the logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure. A multithreaded processor can be implemented via a processor with multiple hardware execution contexts executing concurrently, or as multiple processors with a single hardware execution context (e.g., a symmetric multiprocessing (SMP) cluster).

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
creating, at a hypervisor of a computing device, at least a first virtual processor for a first guest operating system; and
scheduling, for execution on a hardware processor of the computing device, the first virtual processor and at least a second virtual processor created for a second guest operating system, wherein the first virtual processor has a first priority corresponding to a first task priority of a corresponding first task, wherein the second virtual processor has a second priority corresponding to a second task priority of a corresponding second task, wherein the first task priority is assigned to the first task by the first guest operating system and the second task priority is assigned to the second task by the second guest operating system, wherein the hypervisor has access to priority information associated with tasks of the first operating system including the first task and tasks of the second guest operating system including the second task, and wherein the hypervisor assigns priority to the first virtual processor and to the second virtual processor based on the priority information associated with the first task and the second task.

2. The method of claim 1, further comprising:
receiving, at the hypervisor of the computing device, a first request from the first guest operating system to create the first virtual processor to execute the first task of the first guest operating system; and
blocking or unblocking the first virtual processor based on a second request from the first task of the first guest operating system.

3. The method of claim 1, further comprising determining to schedule the first virtual processor associated with the first task before scheduling the second virtual processor associated with the second task of the second guest operating system.

4. The method of claim 3, wherein determining to schedule the first virtual processor before the second virtual processor comprises determining that the first priority of the first virtual processor is higher than the second priority of the second virtual processor.

5. The method of claim 1, wherein the first task of the first guest operating system and the second task of the second guest operating system are configured to access a common synchronization primitive.

6. The method of claim 5, wherein the synchronization primitive comprises a data value stored in a memory that is shared by the first guest operating system and the second guest operating system, wherein the data value is stored in a user-mode address of the memory.

7. The method of claim 5, wherein when a task of a particular guest operating system holds the synchronization primitive, the task of the particular guest operating system has read-write access to the synchronization primitive, and at least one task of another guest operating system that is blocked on the synchronization primitive has read-only access to the synchronization primitive.

8. The method of claim 7, wherein the at least one task of the other guest operating system is unblocked upon expiration of a timeout period when the synchronization primitive is not released during the timeout period.

9. The method of claim 1, wherein priorities of tasks of the first guest operating system and priorities of tasks of the second guest operating system are selected from a common set of priorities.

10. The method of claim 1, wherein the first guest operating system has a first maximum priority that the first guest operating system can assign to tasks of the first guest operating system, and wherein the second guest operating system has a second maximum priority that the second guest operating system can assign to tasks of the second guest operating system.

11. The method of claim 10, wherein the first maximum priority is different from the second maximum priority.

12. The method of claim 1, wherein the hypervisor is configured to temporarily elevate a priority of a lower priority task of either the first guest operating system or the second guest operating system when the lower priority task of either the first guest operating system or the second guest operating system blocks a higher priority task.

13. The method of claim 1, further comprising:
receiving, at the hypervisor, a request from the first guest operating system to create a third virtual processor to execute a third task;

creating a third virtual processor for the first guest operating system;

scheduling, for execution on the hardware processor of the computing device, the third virtual processor, wherein the third virtual processor has a third priority corresponding to a third task priority of the corresponding third task, the third task priority assigned by the first guest operating system; and determining to schedule the first virtual processor before the third virtual processor after determining that the first priority of the first virtual processor is higher than the third priority of the third virtual processor.

14. A non-transitory computer-readable medium comprising instructions that, when executed by a computer, cause the computer to:

create, at a hypervisor, at least a first virtual processor for a first guest operating system; and schedule the first virtual processor and at least a second virtual processor created for a second guest operating system for execution, wherein the first virtual processor has a first priority corresponding to a first task priority of a corresponding first task, wherein the second virtual processor has a second priority corresponding to a second task priority of a corresponding second task, wherein the first task priority is assigned to the first task by the first guest operating system and the second task priority is assigned to the second task by the second guest operating system, wherein the hypervisor has access to priority information associated with tasks of the first guest operating system including the first task and tasks of the second guest operating system including the second task, and wherein the hypervisor assigns priority to the first virtual processor and to the second virtual processor based on the priority information associated with the first task and the second task.

15. The computer-readable medium of claim 14, further comprising instructions that, when executed by the computer, cause the computer to:

receive, at the hypervisor, a first request from the first guest operating system to create the first virtual processor to execute the first task of the first guest operating system; and block or unblock the first virtual processor based on a second request from the first task of the first guest operating system.

16. An apparatus comprising:
a processor;
a first guest operating system; and
a second guest operating system,
wherein the first guest operating system requests a hypervisor to create a first virtual processor to execute a first task;
wherein the second guest operating system requests the hypervisor to create a second virtual processor to execute a second task;
wherein the hypervisor creates the first virtual processor and the second virtual processor; and
wherein the first and second virtual processors are schedulable on the processor and wherein the first virtual processor has a first priority corresponding to a first task priority of the first task, wherein the second virtual processor has a second priority corresponding to a second task priority of the second task, wherein the first task priority is assigned to the first task by the first guest operating system and the second task priority is assigned to the second task by the second guest operating system, wherein the hypervisor has access to priority information associated with tasks of the first guest operating system including the first task and tasks of the second guest operating system including the second task, and wherein the hypervisor assigns priority to the first virtual processor and to the second virtual processor based on the priority information associated with the first task and the second task.

17. The apparatus of claim 16, wherein the first and second guest operating systems rely on the hypervisor to schedule tasks for execution by scheduling virtual processors corresponding to the tasks for execution.

18. The apparatus of claim 16, wherein the first and second guest operating systems are real-time operating systems.

19. The apparatus of claim 16, wherein each task of the second guest operating system is executed by a corresponding virtual processor that is requested by the second guest operating system.

20. The apparatus of claim 16, wherein the first task of the first guest operating system and the second task of the second guest operating system are configured to access a common synchronization primitive.

21. The apparatus of claim 20, wherein the synchronization primitive comprises a data value stored in a memory that is shared by the first guest operating system and the second guest operating system, wherein the data value is stored in a user-mode address of the memory.

22. The apparatus of claim 20, wherein when a task of a particular guest operating system holds the synchronization primitive, the task of the particular guest operating system has read-write access to the synchronization primitive, and at least one task of another guest operating system that is blocked on the synchronization primitive has read-only access to the synchronization primitive.

23. The apparatus of claim 22, wherein the at least one task of the other guest operating system is unblocked upon expiration of a timeout period when the synchronization primitive is not released during the timeout period.

24. The apparatus of claim 16, wherein priorities of tasks of the first guest operating system and priorities of tasks of the second guest operating system are selected from a common set of priorities.

25. The apparatus of claim 16, wherein the first guest operating system has a first maximum priority that the first guest operating system can assign to tasks of the first guest operating system, and wherein the second guest operating system has a second maximum priority that the second guest operating system can assign to tasks of the second guest operating system.

26. The apparatus of claim 25, wherein the first maximum priority is different from the second maximum priority.

27. The apparatus of claim 16, wherein the hypervisor is configured to temporarily elevate a priority of a lower priority task of either the first guest operating system or the second guest operating system when the lower priority task of either the first guest operating system or the second guest operating system blocks a higher priority task.

28. A method comprising:
receiving, at a first guest operating system executing at a computing device comprising a hypervisor and at least one processor, a request to create a first task;
requesting, by the first guest operating system, the hypervisor to create a first virtual processor to execute the first task, the first virtual processor being created for the first guest operating system, wherein the first virtual processor and a second virtual processor created for a second guest operating system are schedulable on the at least one processor; and assigning a task priority to the first task by the first guest operating system, wherein a priority of the first virtual processor corresponds to the task priority, wherein task priority information of the first guest operating system including the first task is accessible to the hypervisor, and wherein the hypervisor assigns priority to the first virtual processor based on the task priority information associated with the first task.

29. The method of claim 28, wherein the first guest operating system is a real-time operating system.

30. The method of claim 29, wherein the real-time operating system has access to at least one elevated task priority level that is unavailable to a non real-time operating system.

31. The method of claim 28, wherein the first task of the first guest operating system and a second task of the second guest operating system are configured to access a common synchronization primitive.

32. The method of claim 31, wherein the common synchronization primitive comprises a data value stored in a memory that is shared by the first guest operating system and the second guest operating system, wherein the data value is stored in a user-mode address of the memory.

33. The method of claim 31, wherein when a task of a particular guest operating system holds the synchronization primitive, the task of the particular guest operating system has read-write access to the synchronization primitive, and at least one task of another guest operating system that is blocked on the synchronization primitive has read-only access to the synchronization primitive.

34. The method of claim 33, wherein the at least one task of the other guest operating system is unblocked upon expiration of a timeout period when the synchronization primitive is not released during the timeout period.

35. The method of claim 28, wherein priorities of tasks of the first guest operating system and priorities of tasks of the second guest operating system are selected from a common set of priorities.

36. The method of claim 28, wherein the first guest operating system has a first maximum priority that the first guest operating system can assign to tasks of the first guest operating system, and wherein the second guest operating system has a second maximum priority that the second guest operating system can assign to tasks of the second guest operating system.

37. The method of claim 36, wherein the first maximum priority is different from the second maximum priority.

38. The method of claim 28, wherein the hypervisor is configured to temporarily elevate a priority of a lower priority task of either the first guest operating system or the second guest operating system when the lower priority task of either the first guest operating system or the second guest operating system blocks a higher priority task.

39. An apparatus comprising:
a processor;
a first guest operating system; and
a second guest operating system,
wherein the first guest operating system comprises means for requesting a hypervisor to create a first virtual processor to execute a first task in response to receiving a request to create the first task, the first virtual processor created for the first guest operating system, wherein the first virtual processor and a second virtual processor created for the second guest operating system are schedulable on the processor, wherein the first virtual processor has a first priority corresponding to a first task priority of a corresponding first task, wherein the second virtual processor has a second priority corresponding to a second task priority of a corresponding second task, wherein the first task priority is assigned to the first task by the first guest operating system and the second task priority is assigned to the second task by the second guest operating system, wherein the hypervisor has access to priority information associated with tasks of the first guest operating system including the first task and tasks of the second guest operating system including the second task, and wherein the hypervisor assigns priority to the first virtual processor and to the second virtual processor based on the priority information associated with the first task and the second task.

40. The apparatus of claim 39, wherein the first and second guest operating systems are real-time operating systems.

41. A non-transitory computer-readable medium comprising instructions that, when executed by a computer, cause the computer to:
receive, at a first guest operating system, a request to create a first task; and
request a hypervisor to create a first virtual processor to execute the first task, the first virtual processor being created for the first guest operating system, wherein the first virtual processor and a second virtual processor created for a second guest operating system are schedulable on a hardware processor, wherein the first virtual processor has a first priority corresponding to a first task priority of the first task, wherein the second virtual processor has a second priority corresponding to a second task priority of a second task, wherein the first task priority is assigned to the first task by the first guest operating system and the second task priority is assigned to the second task by the second guest operating system, wherein the hypervisor has access to priority information associated with tasks of the first guest operating system including the first task and tasks of the second guest operating system including the second task, and wherein the hypervisor assigns priority to the first virtual processor and to the second virtual processor based on priority information associated with the first task and the second task.

42. The computer-readable medium of claim 41, wherein the first and second guest operating systems are real-time operating systems.

43. The computer-readable medium of claim 41, wherein the first guest operating system is a real-time operating system that has access to at least one elevated task priority level that is unavailable to a non real-time operating system.

* * * * *